United States Patent [19]

Takeda et al.

[11] Patent Number: 5,351,230
[45] Date of Patent: Sep. 27, 1994

[54] OPTICAL INFORMATION SYSTEM FOCAL POINT DISPLACEMENT DETECTING MEANS HAVING FRESNEL ZONE PLATES WITH RECTILINEAR GRATING

[75] Inventors: Tadashi Takeda, Nagano; Hiroyuki Wada, Tokyo; Kenji Fukui, Tokyo; Ricardo M. Okamoto, Tokyo; Shohei Hashiguchi, Tokyo, all of Japan

[73] Assignee: Nippon Steel Corporation, Tokyo, Japan

[21] Appl. No.: 964,964

[22] Filed: Oct. 22, 1992

[30] Foreign Application Priority Data

Oct. 23, 1991 [JP] Japan ................... 3-304068
Oct. 23, 1991 [JP] Japan ................... 3-304069

[51] Int. Cl.$^5$ ............................ G11B 7/00; G11B 7/09
[52] U.S. Cl. ............................ 369/112; 369/44.23; 369/44.14
[58] Field of Search ............ 369/112, 44.23, 44.12, 369/44.14, 44.41

[56] References Cited

U.S. PATENT DOCUMENTS

| 4,929,823 | 5/1990 | Kato et al. | 369/45 |
| 4,970,710 | 11/1990 | Lee | 369/44.23 |
| 5,111,448 | 5/1992 | Komma et al. | 369/112 |
| 5,161,040 | 11/1992 | Yokoyama et al. | 369/44.12 |
| 5,195,072 | 3/1993 | Fukui et al. | 369/44.23 |

FOREIGN PATENT DOCUMENTS

| 53-39123 | 10/1978 | Japan . |
| 57-12188 | 3/1982 | Japan . |
| 287336 | 3/1990 | Japan . |

*Primary Examiner*—Paul M. Dzierzynski
*Assistant Examiner*—Kim-Kwok Chu
*Attorney, Agent, or Firm*—Pollock, Vande Sande & Priddy

[57] ABSTRACT

This invention pertains to a displacement detecting device for an optical head for detecting focal point displacement of irradiation light. The displacement detecting device has optical means for converting reflected rays from an irradiated face into an astigmatic bundle of rays and a photodetector for detecting a change in the the focused shape. The displacement detecting device thus detects focal point displacement of irradiation light. The optical means is obtained by integrally forming a plurality of Fresnel zone plates having rectilinear gratings, focusing reflected rays from the irradiated face, and having different focal lengths.

7 Claims, 13 Drawing Sheets

FIG. 3
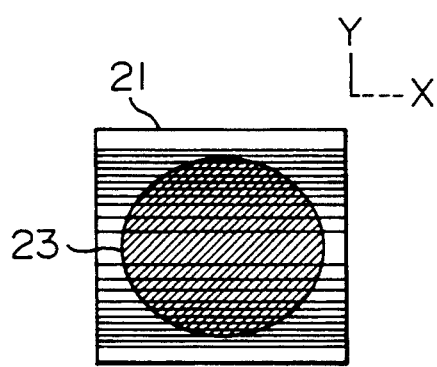
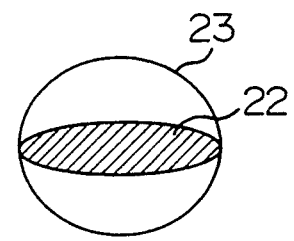
FIG. 4A
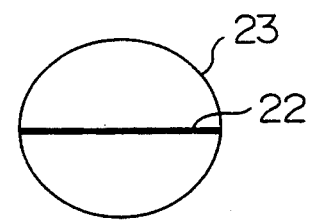
FIG. 4B
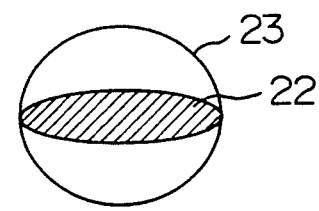
FIG. 4C
FIG. 5
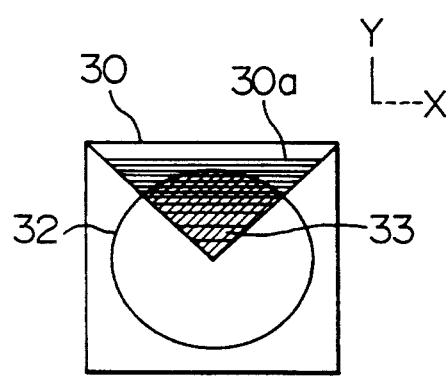
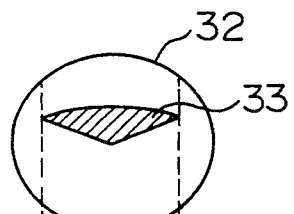
FIG. 6A
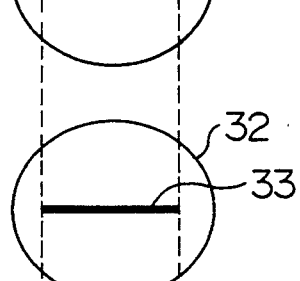
FIG. 6B
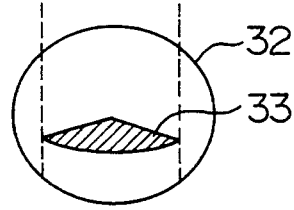
FIG. 6C

BUNDLE OF RAYS IN Y DIRECTION

BUNDLE OF RAYS IN X DIRECTION

FIG. 12A
FIG. 12B
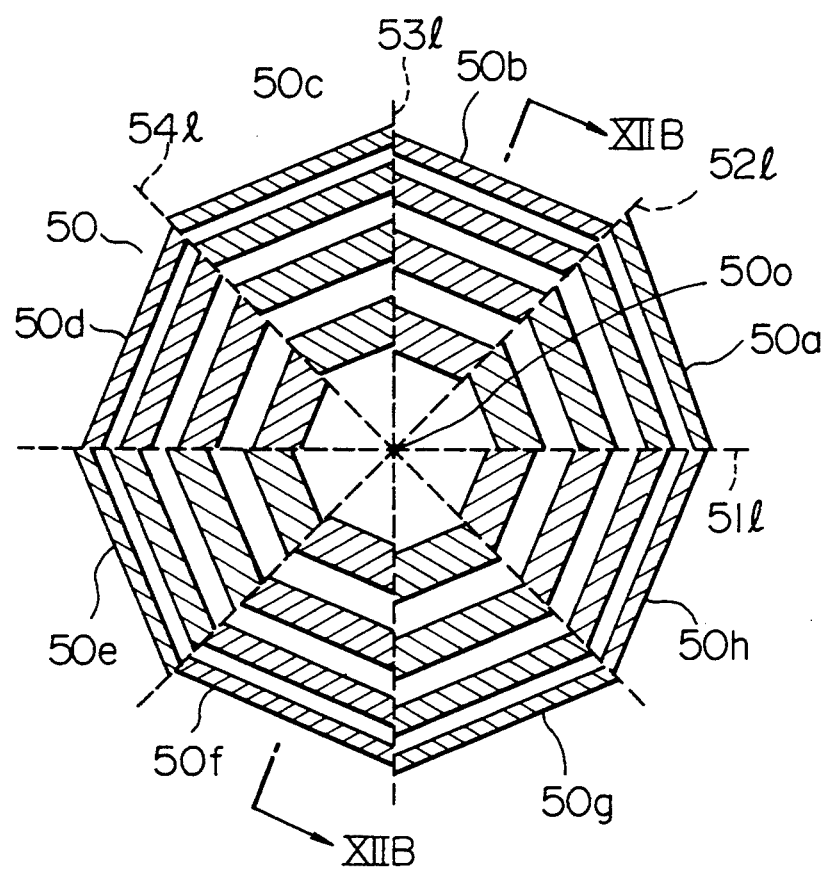
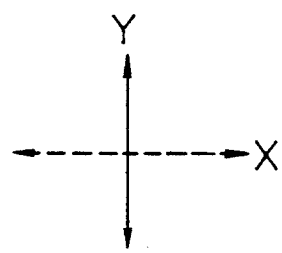

FIG. 17 PRIOR ART
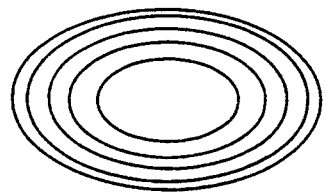
FIG. 18A                    FIG. 18B
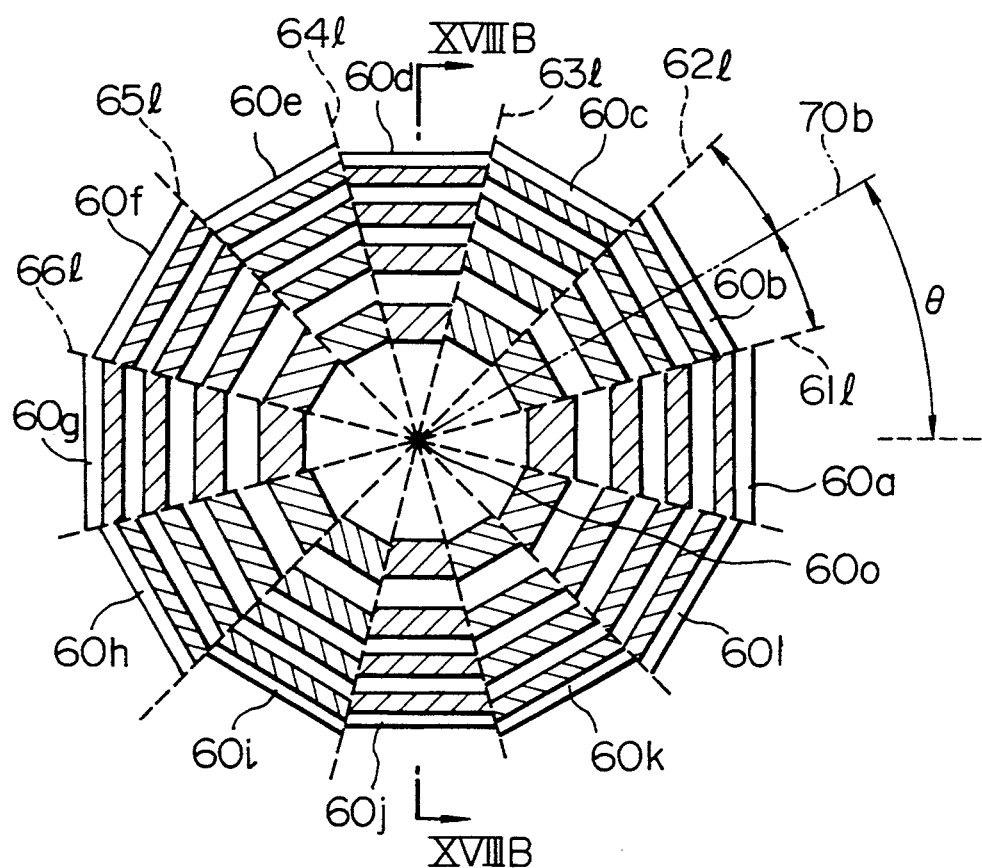

FIG. 20A
PRIOR ART
FIG. 20B
PRIOR ART
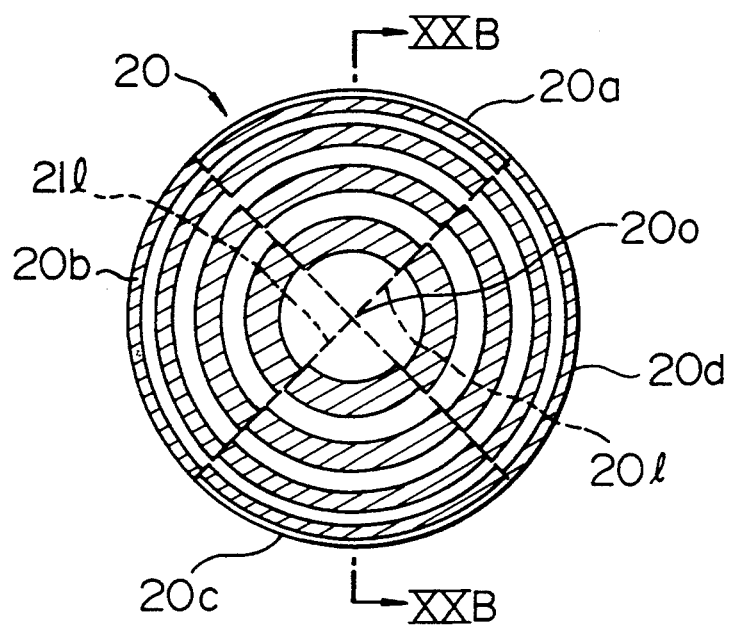

OPTICAL INFORMATION SYSTEM FOCAL POINT DISPLACEMENT DETECTING MEANS HAVING FRESNEL ZONE PLATES WITH RECTILINEAR GRATING

BACKGROUND OF THE INVENTION

1. Field of the Invention

The present invention relates to a displacement detecting device for optical head for detecting focus displacement and track displacement of irradiation light with respect to an irradiated face of an information recording medium.

2. Description of the Related Art

An optical device formed by a combination of a convex lens and a cylindrical lens have been used for detecting displacement of focal positions of a laser beam from an optical head irradiating on a surface of an information recording medium as disclosed in JPB 53-39123 and JPB 57-12188, for example. The above mentioned optical device of the prior art cannot be produced in a sufficiently small size with a light weight. Then, a quadrifid Fresnel zone plate has been improved to be used in a displacement detecting device instead of the above optical devices.

FIG. 19 is an oblique view showing a conventional displacement detecting device for optical head which is described in JP-A-2-87336.

In FIG. 19, laser light emitted from a laser light source 1 is converted into a bundle of parallel rays by a collimator lens 2. The collimated rays are applied to an information recording medium 5 via a beam splitter 3. The irradiating laser rays are focused on the information recording medium 5 by an object lens 4. This object lens 4 is driven by a driver which is not illustrated and is subjected to feedback control so that rays may be always focused on the information recording medium 5. Reflected rays from the information recording medium 5 are splitted by the beam splitter 3 via the object lens 4 and led to a displacement detecting system called "astigmatism system". Rays for detecting focus displacement splitted by the beam splitter 3 are applied onto a quadrifid photodetector 9 via a quadrifid Fresnel zone plate 20. The quadrifid Fresnel zone plate 20 diffracts rays for detecting focus displacement to convert into an astigmatic bundle of rays having a wave front which is not homocentric.

The quadrifid Fresnel zone plate 20 used here is shown in FIGS. 20A and 20B. FIG. 20A is a top view of the plate. FIG. 20B is a sectional view of the plate seen along XXB—XXB. This quadrifid Fresnel zone plate 20 is divided into four sectors 20a, 20b, 20c and 20d by two partition lines 20l and 21l passing through the center 20o which are perpendicular to each other. Further, in opposing diagonal sectors 20a and 20c, and 20b and 20d, optical unevenness taking the shape of concentric circles as represented by shaded regions in FIG. 20A are formed so that primary diffracted rays may be converged at the same focal length.

The quadrifid Fresnel zone plate 20 and the quadrifid photodetector 9 thus formed are disposed so that the two partition lines 20l and 21l of the quadrifid Fresnel zone plate 20 may coincide with the two partition lines of the quadrifid photodetector 9 when they are viewed from the direction of the optical axis. Detected signals A, B, C and D respectively fed from the photodetecting sectors 9a, 9b, 9c and 9d of the quadrifid photodetector 9 are subjected to processing in adders 11 and 12 and a subtracter 13 to output a focus displacement signal F. In addition, the detected signals A, B, C and D are subjected to processing in a subtracter 15 to output a track displacement signal T. The focus displacement signal F and the track displacement signal T are represented by the following equations.

$$F = (A+C) - (B+D)$$

$$T = (D-B)$$

Depending on the position of the object lens 4 with respect to the information recording medium 5, images are formed on the quadrifid photodetector 9 as shown in FIGS. 21A, 21B, 22A, 22B, 23A and 23B. That is to say, if the information recording medium 5 is disposed at this side of the focal point of the object lens 4 as shown in FIG. 21A, the displacement detecting rays form images so that images may become large on photodetecting sectors 9a and 9c of the quadrifid photodetector 9 and images may become small on photodetecting sectors 9b and 9d as shown in FIG. 21B. Therefore, the focus displacement signal F becomes positive.

If the information recording medium 5 is accurately located on the focal point of the object lens 4, the rays for detecting displacement form a circular beam on the quadrifid photodetector 9 as shown in FIG. 22A. Therefore, detection signals A, B, C and D respectively of the photodetecting sectors 9a, 9b, 9c and 9d have the same magnitude as shown in FIG. 22B. Therefore, the focus displacement signal F becomes 0.

If the information recording medium 5 is located beyond the focal point of the object lens 4 as shown in FIG. 23A, the rays for detecting displacement form images so that images may become small on the photodetecting sectors 9a and 9c of the quadrifid photodetector 9 and images may become large on the photodetecting sectors 9b and 9d as shown in FIG. 23B. Therefore, the focus displacement signal F becomes negative.

In this way, the focus displacement signal F varies according to the position of the information recording medium 5 with respect to the object lens 4. By feeding back this focus displacement signal F to the driver for driving the object lens 4 in the focus direction, control is exercised so that the laser rays may form a focal point just on the information recording medium 5.

The case where only focus displacement is involved but track displacement is absent is shown in FIGS. 21A, 21B, 22A, 22B, 23A and 23B. If the focus displacement is absent and track displacement is present, however, an image as shown in FIG. 24 is formed on the quadrifid photodetector 9. That is to say, the shape of the image is identical with that in focus as shown in FIG. 22B. However, the brightness varies according to the track displacement. FIG. 24 shows the case where track displacement has occurred in the lateral direction. By performing feedback according to the track displacement, control is exercised so that the laser rays may get on a track of the information recording medium 5 accurately.

Positions of partition lines of the quadrifid photodetector 9 and the quadrifid Fresnel zone plate 20 need not be the positions shown in FIG. 19 as long as partition lines of the quadrifid photodetector 9, respectively, coincide with the corresponding partition lines of the quadrifid Fresnel zone plate 20 when viewed from the direction of the optical axis. For example, the quadrifid photodetector 9 and the quadrifid Fresnel zone plate 20 may be so disposed as to be rotated by 45 degrees around the optical axis as compared with the illustrated positions. In this case, the track displacement signal T is represented by the following equation.

$$T = (A - C) + (D - B)$$

In the conventional optical head as described above, the quadrifid Fresnel zone plate 20 is used to convert rays for detecting focus displacement into an astigmatic bundle of rays and form an image on the quadrifid photodetector 9. The quadrifid Fresnel zone plate 20 is fabricated by means of a precision machining technique used in the semiconductor manufacturing process. In this process, it is necessary to first draw a mask by using an electron beam direct lithography device or pattern generator, or the like.

However, the conventional quadrifid Fresnel zone plate 20 is shaped in curves. In order to draw the curves accurately, it was necessary to make the beam diameter small in the electron beam direct lithography device or the pattern generator, or the like, set and control a drawing position finely. For manufacturing such a mask having curves, therefore, enormous computation time and exposure time were needed, and the production cost became high, resulting in problems.

SUMMARY OF THE INVENTION

The present invention has been made in order to solve the above described problems. An object of the present invention is to provide a displacement detecting device for optical head which reduces necessary time to draw patterns using an electron beam direct lithography device or pattern generator, or the like, and which can be manufactured at a moderate cost.

The above described object is achieved by a displacement detecting device for optical head including optical means for converting reflected rays from an irradiated face of an information recording medium into an astigmatic bundle of rays and focusing the rays on two or more different focal point positions and detecting means for detecting displacement of irradiation position of irradiation light on the irradiated face corresponding to the difference of the respective focal point positions of the reflected rays, wherein the optical means is formed integrally by a plurality of focusing members for focusing the reflected rays on two or more different focal points, each of the focusing members having a rectilinear grating for focusing reflected rays coming from the irradiated face, and wherein the detecting means includes a photodetector for detecting focusing shapes of the reflected rays focused by the focusing member and detects displacement between a condensing position of the irradiation light and the irradiated face on the basis of detection signals detected by the photodetector.

In accordance with the present invention, reflected rays from an irradiated face are converted into an astigmatic bundle of rays by optical means, which is formed integrally by a plurality of Fresnel zone plates having a plurality of different focal lengths and each having a rectilinear grating for focusing reflected rays from the irradiated face, and a change in focused shape is detected by the photodetector to detect focal point displacement of the irradiation light.

Further, the above described object is achieved by a displacement detecting device for optical head including optical means integrally formed by disposing a group of first rectilinear Fresnel zone plates for focusing reflected rays on a first focal point and a group of second rectilinear Fresnel zone plates for focusing reflected rays on a second focal point, and detecting means including a photodetector for detecting focusing shapes of the reflected rays focused by the first rectilinear Fresnel zone plates and the second rectilinear Fresnel zone plates, displacement of the condensing position of irradiation light from the irradiated face being detected on the basis of detection signals detected by the photodetector.

In a device for applying irradiation light emitted by an optical head onto a surface of an information recording medium, the displacement detecting device for optical head of the present invention for detecting displacement of the condensing position of irradiation light from the irradiated face has optical means for focusing reflected rays from the irradiated face, the optical means including a plurality of condensing sector groups each having a different focul length and being formed by a Fresnel zone plate having a rectilinear grating and functioning to focus incident rays on nearly the same focal point; detecting means for outputting a detection output corresponding to the focused rays, the detecting means having the same number of photodetecting sectors disposed in positions corresponding to respective condensing sector groups; and computing means for generating a focus displacement signal and a track displacement signal on the basis of the detection output.

BRIEF DESCRIPTION OF THE DRAWINGS

FIG. 3 is a diagram showing the state of incidence of a bundle of rays to a Fresnel zone plate having rectilinear gratings;

FIG. 4A is a sectional view of a bundle of rays, which has been diffracted by the Fresnel zone plate shown in FIG. 3, in a position located nearer to the Fresnel zone plate than the focal point position of the Fresnel zone plate;

FIG. 4B is a sectional view of a bundle of rays, which has been diffracted by the Fresnel zone plate shown in FIG. 3, in the focal point position of the Fresnel zone plate;

FIG. 4C is a sectional view of a bundle of rays, which has been diffracted by the Fresnel zone plate shown in FIG. 3, in a position located farther than the focal point position of the Fresnel zone plate;

FIG. 5 is a diagram showing a condensing sector partly cut out from a quadrifid Fresnel zone plate and an incident bundle of rays in a first embodiment of the present invention;

FIG. 6A is a sectional view of a diffracted bundle of rays in a position located closer to the Fresnel zone plate than the focal point position of the condensing sector shown in FIG. 5;

FIG. 6B is a sectional view of a diffracted bundle of rays in the focal point position of the condensing sector shown in FIG. 5;

FIG. 6C is a sectional view of a diffracted bundle of rays in a position located farther than the focal point position of the condensing sector shown in FIG. 5;

FIG. 12A is a top view of an octamerous Fresnel zone plate having rectilinear gratings used in the displacement detecting device for optical head;

FIG. 12B is a sectional view of the Fresnel zone plate of FIG. 12A seen along a line XIIB—XIIB;

FIG. 17 is a diagram showing a conventional elliptical Fresnel zone plate;

FIG. 18A is a top view of a Fresnel zone plate divided into twelve sectors having rectilinear gratings used in a displacement detecting device for optical head according to a fourth embodiment of the present invention;

FIG. 18B is a sectional view of the Fresnel zone plate of FIG., 18A seen along a line XVIIIB—XVIIIB;

FIG. 20A is a top view of a quadrifid Fresnel zone plate having gratings of concentric circles used in the conventional displacement detecting device for optical head;

FIG. 20B is a sectional view of the Fresnel zone plate of FIG. 20A seen along a line XXB—XXB;

DESCRIPTION OF THE PREFERRED EMBODIMENTS

Figure 1:
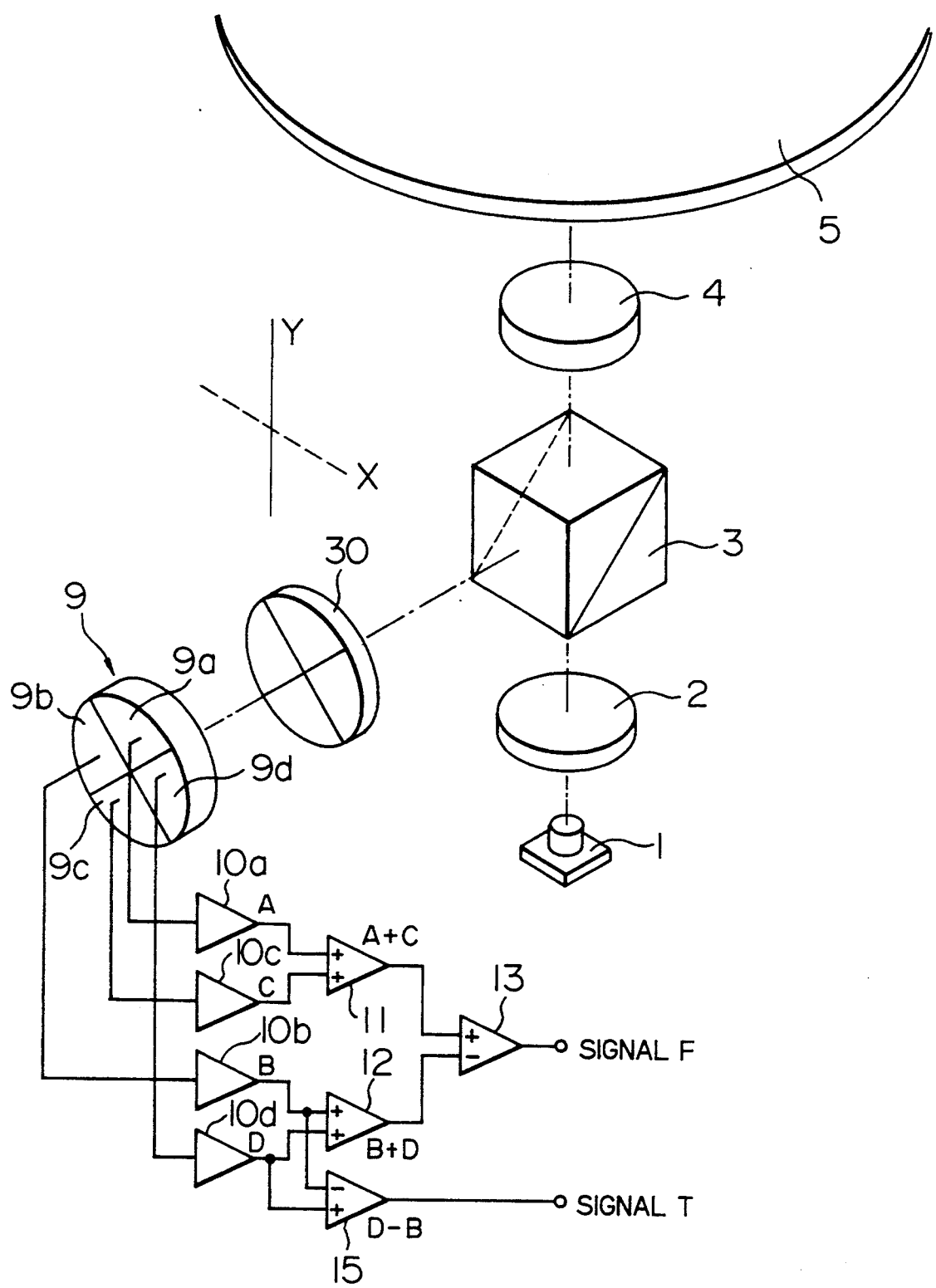
FIG. 1 is a perspective view showing a displacement detecting device for optical head according to a first embodiment of the present invention together with a schematic logic diagram.
Figure 19:
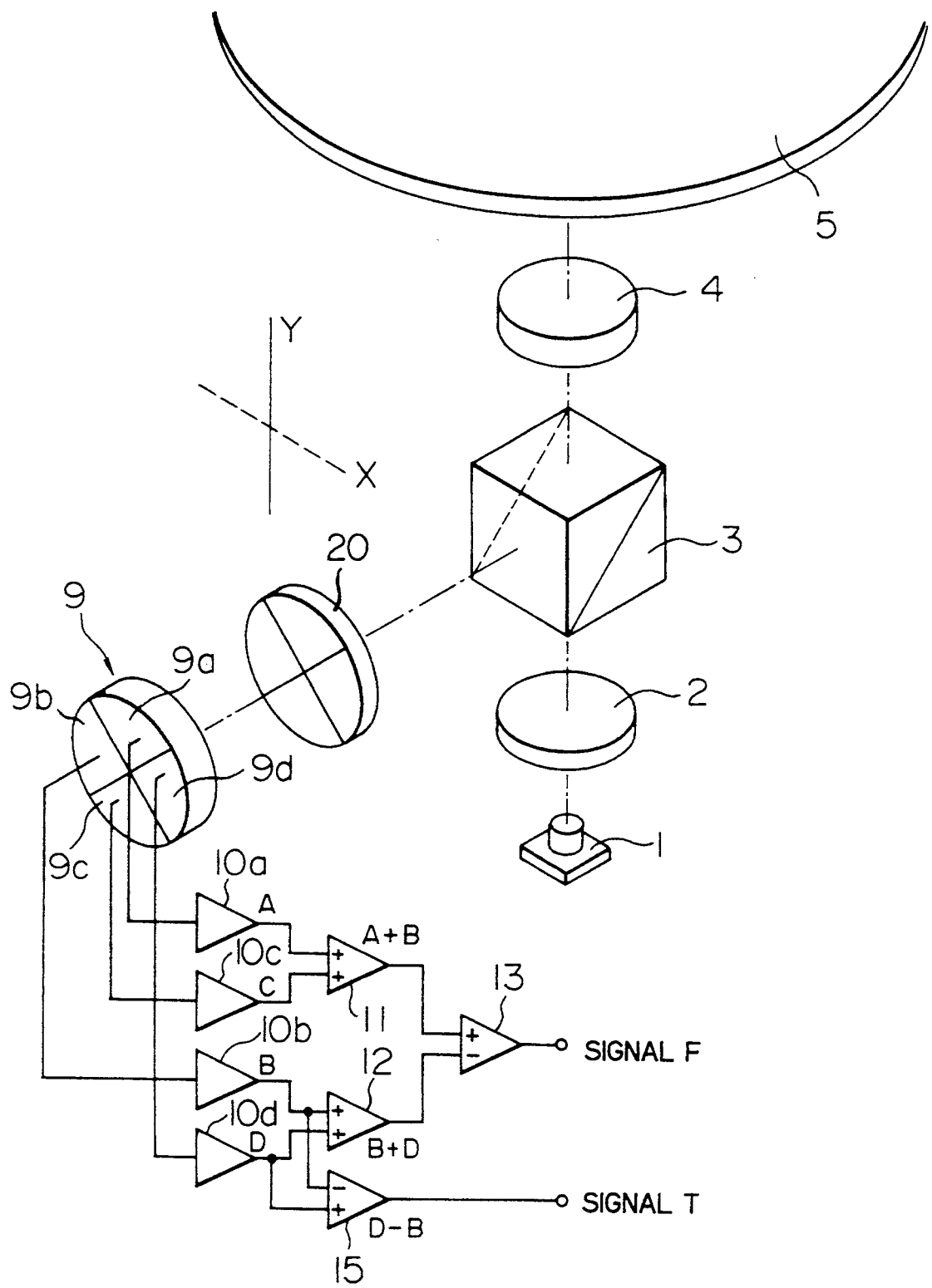
FIG. 19 is an oblique view showing a conventional displacement detecting device for optical head together with a schematic logic diagram.
Figure 21A:
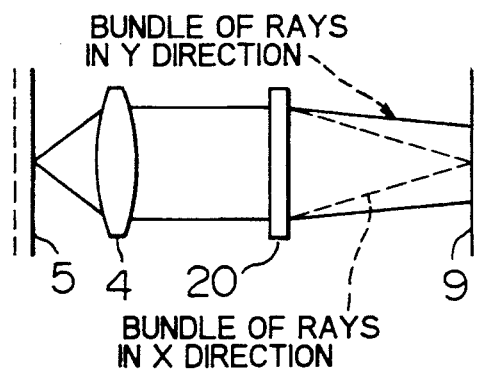
FIG. 21A is a diagram illustrating a state of bundle of rays of the case where an information recording medium is located nearer as compared with the focal point of an object lens of the conventional displacement detecting device for optical head.
Figure 21B:
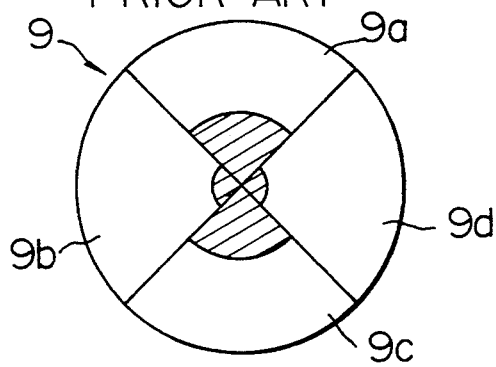
FIG. 21B is a diagram showing an image of rays for detecting displacement in the state of FIG. 21A.
Figure 22A:
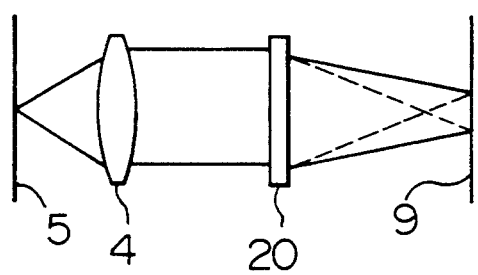
FIG. 22A is a diagram illustrating a state of bundle of rays of the case where the information recording medium is located in the focal point position of the object lens of the displacement detecting device for optical head.
Figure 22B:
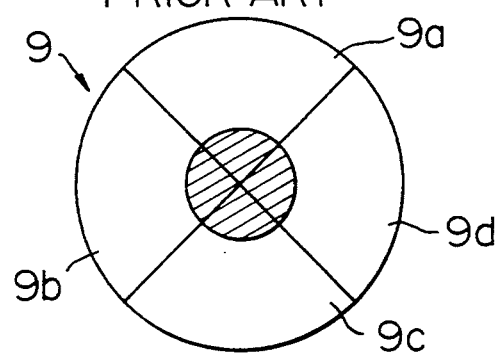
FIG. 22B is a diagram showing an image of rays for detecting displacement in the state of FIG. 22A.
Figure 23A:
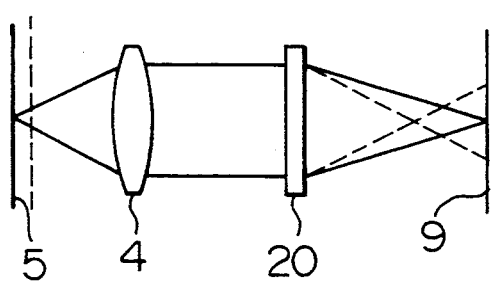
FIG. 23A is a diagram illustrating a state of bundle of rays of the case where the information recording medium is located farther as compared with the focal point of the object lens of the displacement detecting device for optical head.
Figure 23B:
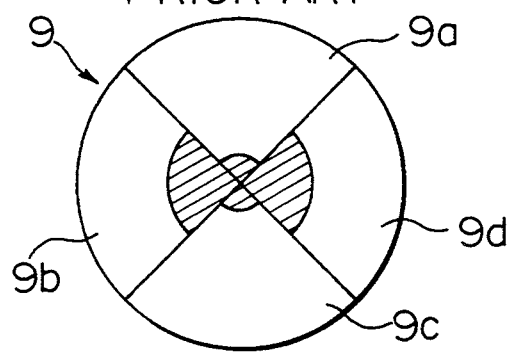
FIG. 23B is a diagram showing an image of rays for detecting displacement in the state of FIG. 23A.
Figure 24:
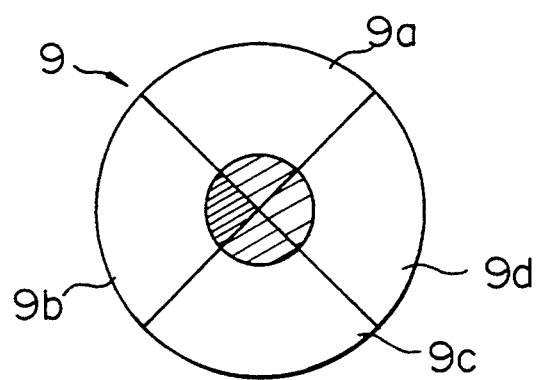
FIG. 24 is a diagram showing an image of rays for detecting displacement obtained when there is track displacement in the conventional displacement detecting device for optical head.

A displacement detecting device for optical head according to a first embodiment of the present invention is shown in FIG. 1. The same components as those of the conventional displacement detecting device for optical head shown in FIG. 19 are denoted by like numerals.

In the first embodiment, a quadrifid Fresnel zone plate 30 having rectilinear gratings is used instead of the quadrifid Fresnel zone plate 20 having curvilinear gratings.

Figures 2A, 2B:
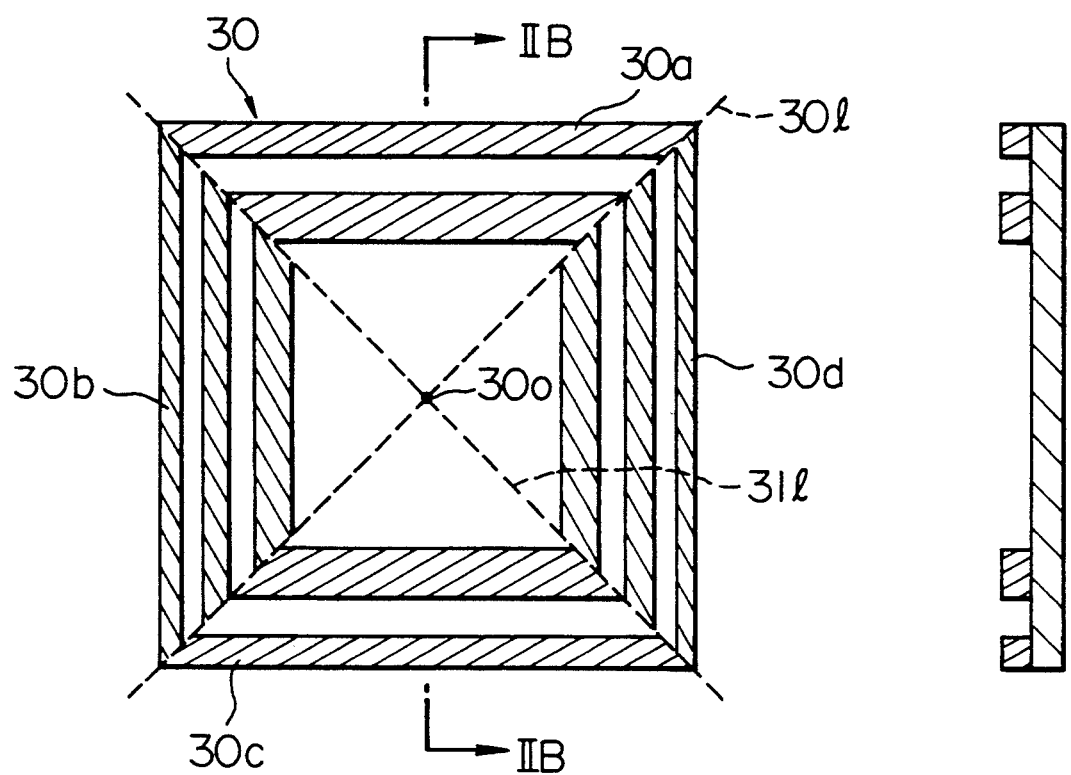
FIG. 2A is a top view of a quadrifid Fresnel zone plate having a rectilinear grating used in the displacement detecting device for optical head.
FIG. 2B is a sectional view of the Fresnel zone plate of FIG. 2A seen along a line IIB—IIB.

The quadrifid Fresnel zone plate 30 having rectilinear gratings used in the present embodiment is shown in FIG. 2. This quadrifid Fresnel zone plate 30 having the rectilinear gratings is divided into four sectors by two partition lines 30*l* and 31*l* which pass through a center 30*o* and which are perpendicular to each other. The gratings of the conventional Fresnel zone plate 20 has concentric circles each having a radius proportionate to the square root of an integer in each plate. However, the gratings of the quadrifid Fresnel zone plate in the present embodiment have tangential lines of the above described concentric circles in an X direction or the sagittal direction and in a Y direction or the meridional direction. To be concrete, gratings in the sectors 30*a* and 30*c* have tangential lines of the concentric circles in the X direction whereas gratings in the sectors 30*b* and 30*d* have tangential lines of the concentric circles in the Y direction.

In the same way as the conventional technique, the opposite diagonal sectors 30a and 30c, and 30b and 30d have equal focal lengths of primary diffracted light. However, the focusing function of the Fresnel zone plate having rectilinear gratings occurs only in a direction perpendicular to the pattern and does not have a focusing function in the direction parallel to the pattern.

The function of the quadrifid Fresnel zone plate according to the first embodiment of the present invention will now be described in more detail by referring to FIGS. 3, 4A, 4B, 4C, 5, 6A, 6B and 6C.

In FIG. 3, there is shown a Fresnel zone plate having gratings linearized only in the X direction for brevity and sectional shapes of a diffracted bundle of rays in the focal point position of the Fresnel zone plate (FIG. 4B), in a position before the focal point (FIG. 4A), and in a position behind the focal point (FIG. 4C). As described above, the present Fresnel zone plate has focusing function only in a direction perpendicular to the gratings. The bundle of rays diffracted by the above described Fresnel zone plate becomes an elliptical bundle of rays in a position before the focal point as shown in FIG. 4A and in a position behind the focal point as shown in FIG. 4C, whereas the bundle of rays diffracted by the above described Fresnel zone plate becomes a rectilinear bundle of rays in the focal position.

A condensing sector is obtained by dividing the above described Fresnel zone plate into four parts and one part is shown in FIG. 5. There are shown sectional shapes of a diffracted bundle of rays in the focal point position of the condensing sector (FIG. 6B), in a position before the focal point (FIG. 6A), and in a position behind the focal point (FIG. 6C).

In a quadrifid Fresnel zone plate 30 in the present embodiment, the condensing sector shown in FIG. 5 is disposed so that diagonal sectors 30a and 30c, and diagonal sectors 30b and 30d may become equal in focal length.

Assuming that the focal length of the primary diffracted light of the sectors 30a and 30c is fa and the focal length of the primary diffracted light of the sectors 30b and 30d is fb, astigmatic difference Δ is represented by the following equation.

$$\Delta = fa - fb.$$

At this time, distances $ra_k$ and $rb_k$ between the center 30o and the k-th boundary lines counted from the center 30o of the sectors 30a and 30c and sectors 30b and 30d, respectively are given as the following equations $$ra_k^2 = k \cdot fa \cdot \lambda$$

$$rb_k^2 = k \cdot fb \cdot \lambda$$

$$(k = 1, 2, 3 \ldots)$$

where λ is the wavelength of reflected light of the information recording medium 5. Converting the astigmatic difference Δ into a distance Δ' in the information recording medium 5, we obtain:

$$\Delta' = \Delta/\beta^2$$

where β is lateral magnification of a part of this optical system ranging from the information recording medium 5 to the quadrifid photodetector 9, and $B^2$ is called longitudinal magnification. The distance corresponding to the astigmatic difference Δ' in the information recording medium 5 is typically to be 10 to 25 μm. From this value, therefore, the astigmatic difference Δ and the lateral magnification are determined and the focal lengths fa and fb of the sectors 30a and 30c and the sectors 30b and 30d, respectively are derived. Thus $ra_k$ and $rb_k$ are automatically determined.

The quadrifid Fresnel zone plate 30 having rectilinear gratings thus obtained and the quadrifid photodetector 9 are disposed so that two partition lines 30l and 31l of the quadrifid Fresnel zone plate 30 and two partition lines of the quadrifid photodetector 9 may overlap each other when viewed from the direction of the optical axis.

The actual quadrifid Fresnel zone plate 30 is formed by a large number of gratings having a number k of lines amounting to at least 200. For brevity of description, however, only gratings having several lines are illustrated.

In FIG. 1, detected signals A, B, C and D fed from the quadrifid photodetector 9 are subjected to processing in adders 11 and 12 and a subtracter 13 to output a focus displacement signal F. In addition, the detected signals A, B, C and D are subjected to processing in a subtracter 15 to output a track displacement signal T. The focus displacement signal F and the track displacement signal T are represented by the following equations:

$$F = (A+C) - (B+D),$$

$$T = (D-B).$$

Figure 7A:
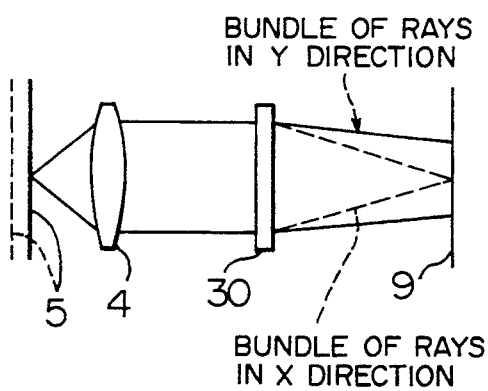
FIG. 7A is a diagram illustrating a state of bundle of rays of the case where an information recording medium is located closer as compared with the focal point of an object lens of the displacement detecting device for optical head.
Figure 7B:
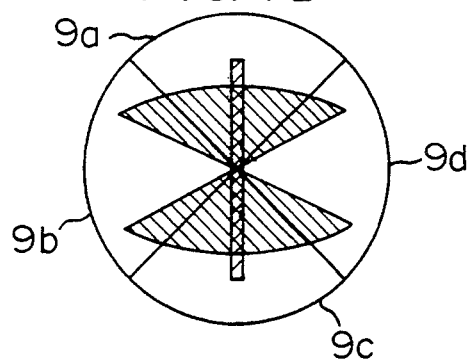
FIG. 7B is a diagram showing an image of rays for detecting displacement in the state of FIG. 7A.
Figure 8A:
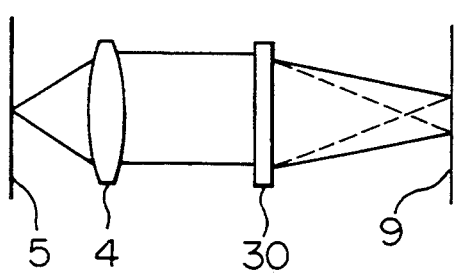
FIG. 8A is a diagram illustrating a state of bundle of rays of the case where the information recording medium is located on the focal point position of the object lens of the displacement detecting device for optical head.
Figure 8B:
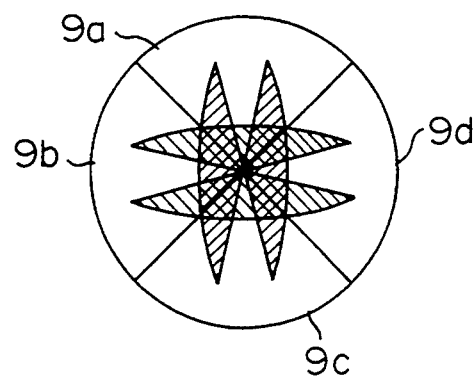
FIG. 8B is a diagram showing an image of rays for detecting displacement in the state of FIG. 8A.
Figure 9A:
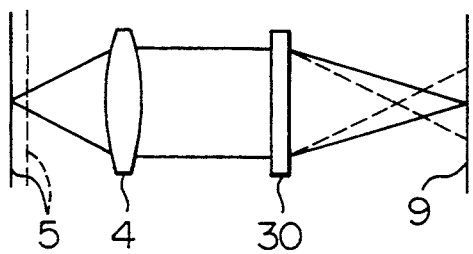
FIG. 9A is a diagram illustrating a state of bundle of rays of the case where an information recording medium is located farther as compared with the focal point of the object lens of the displacement detecting device for optical head.
Figure 9B:
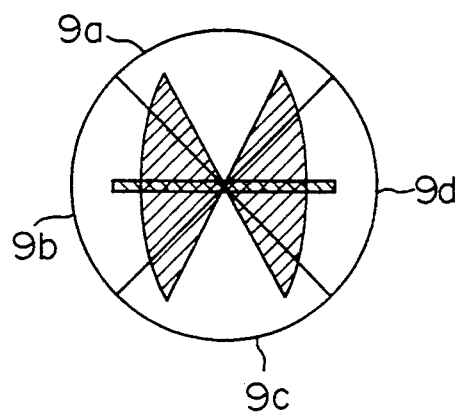
FIG. 9B is a diagram showing an image of rays for detecting displacement in the state of FIG. 9A.

Depending on the position of the object lens 4 with respect to the information recording medium 5 as illustrated in FIGS. 7A, 8A and 9A, images as shown in FIGS. 7B, 8B and 9B are formed on the quadrifid photodetector 9.

If the information recording medium 5 is disposed at this side of the focal point of the object lens 4 as shown in FIG. 7A, the rays for detecting displacement form images so that images may become large on photodetecting sectors 9a and 9c of the quadrifid photodetector 9 and images, may become small on photodetecting sectors 9b and 9d as shown in FIG. 7B. Therefore, the focus displacement signal F becomes positive.

If the information recording medium 5 is accurately located on the focal point of the object lens 4, the rays for detecting displacement form an image on the quadrifid photodetector 9 as shown in FIG. 8B so that the photodetecting sectors 9a, 9b, 9c and 9d of the quadrifid photodetector 9 may become equal in quantity of light. Therefore, the focus displacement signal F becomes 0.

If the information recording medium 5 is located beyond the focal point of the object lens 4 as shown in FIG. 9A, the rays for detecting displacement form images so that images may become large on the photodetecting sectors 9b and 9d of the quadrifid photodetector 9 and images may become small on the photodetecting sectors 9a and 9c as shown in FIG. 9B. Therefore, the focus displacement signal F becomes negative.

Assuming in FIG. 1 that the track direction of the information recording medium 5 is disposed in the Y direction, the shape of the image on the photodetector 9 does not change, but a difference of quantity of light is incurred in the X direction according to the track displacement. By deriving the difference between signals of the photodetecting sectors 9b and 9d, therefore, the track displacement can be detected.

In this way, the present embodiment makes it possible to detect the focus displacement and track displacement by using a quadrifid Fresnel zone plate having rectilinear gratings.

Figure 10:
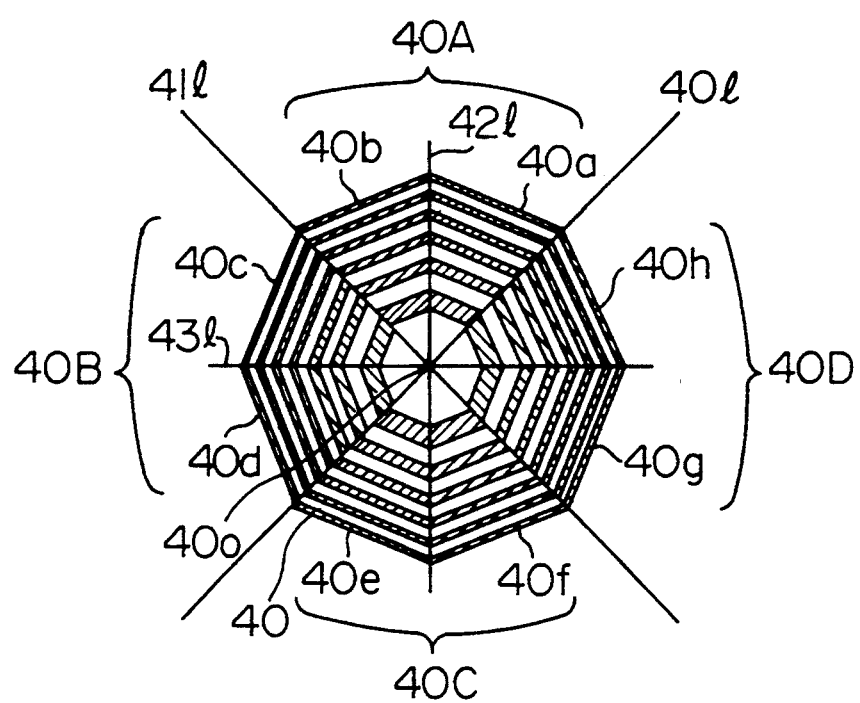
FIG. 10 is a top view of an octamerous Fresnel zone plate having rectilinear gratings used in a displacement detecting device for optical head according to a second embodiment of the present invention.

An octamerous Fresnel zone plate 40 according to the second embodiment of the present invention is shown in FIG. 10. The same components as those of the optical head of the first embodiment shown in FIG. 1 are denoted by like numerals and the description thereof will be omitted.

The present embodiment differs from the first embodiment in that the octamerous Fresnel zone plate 40 is used instead of the quadrifid Fresnel zone plate 30.

The present octamerous Fresnel zone plate 40 is divided into condensing sector groups 40A, 40B, 40C and 40D by two partition lines 40l and 41l which pass through the center 40o and which are perpendicular to each other.

By the other partition line 42l passing through the center 40o, the condensing sector group 40A is divided into condensing sectors 40a and 40b and the condensing sector group 40C is divided into condensing sectors 40e and 40f. By another partition line 43l, the condensing sector group 40B is divided into condensing sectors 40c and 40d and the condensing sector group 40D is divided into condensing sectors 40g and 40h.

The condensing sectors 40a, 40b, 40e and 40f forming the condensing sector groups 40A and 40C have equal focal lengths fa. The condensing sectors 40c, 40d, 40g and 40h forming the condensing sector groups 40B and 40D have equal focal lengths fb.

Further, the partition line 40l is disposed so that the partition line 40l and a partition line 9l of the quadrifid photodetector may overlap each other when viewed from the direction of the optical axis.

In the present embodiment, the octamerous Fresnel zone plate 40 in which each condensing sector group has two condensing sectors has been described. In the present invention, however, the number of condensing sectors forming each condensing sector group is not limited to two. Further, each of condensing sector groups 40A, 40B, 40C and 40D need not be formed by condensing sectors obtained by equally dividing each condensing group.

Figure 11:
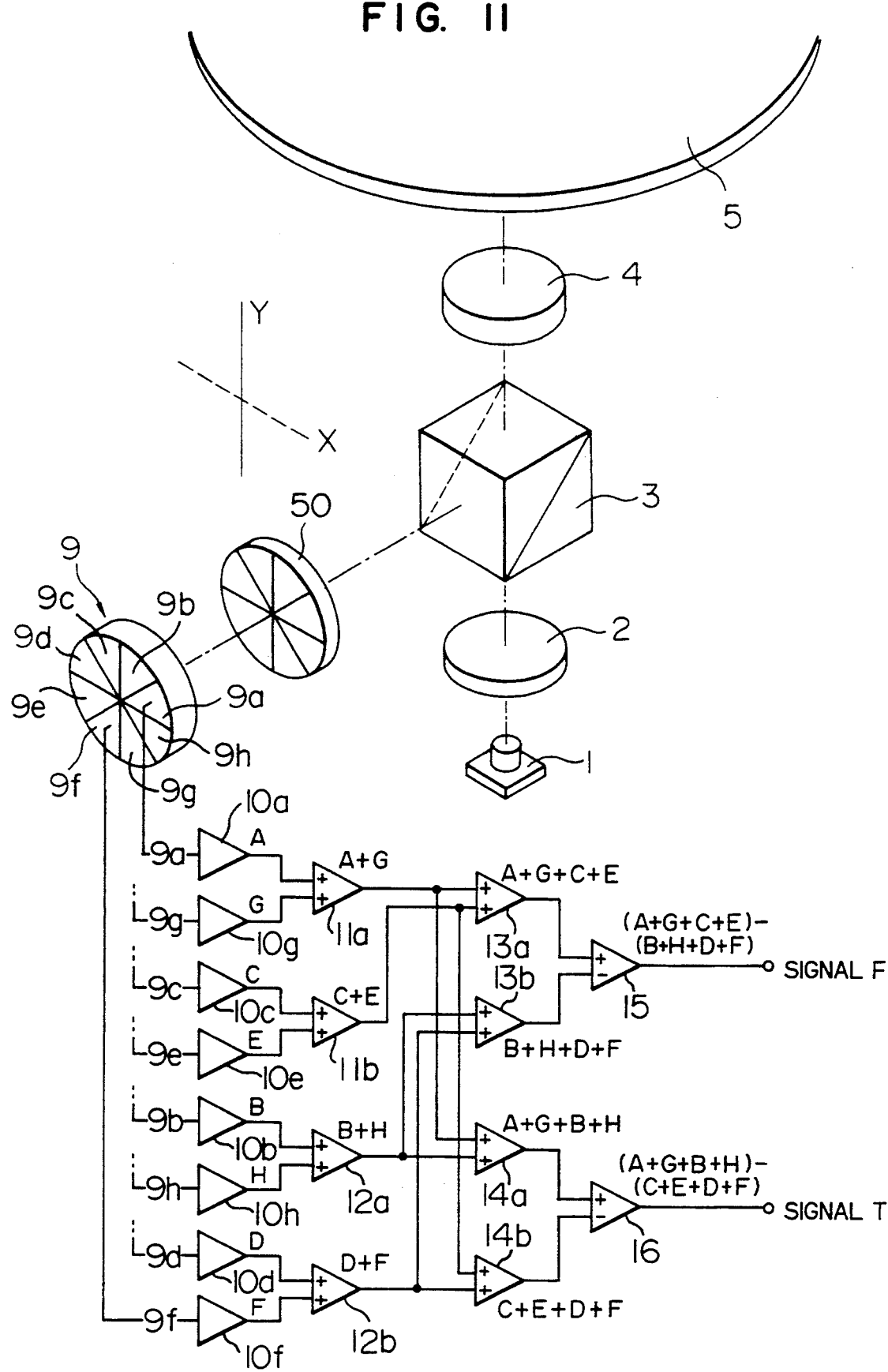
FIG. 11 is an oblique view showing a displacement detecting device for optical head according to a third embodiment of the present invention together with a schematic logic diagram.

A displacement detecting device for optical head according to a third embodiment of the present invention is shown in FIG. 11. The same components as those of the conventional displacement detecting device for optical head shown in FIG. 19 are denoted by like numerals.

In the present embodiment, an octamerous Fresnel zone plate 50 is used instead of the quadrifid Fresnel zone plate 40 used in the second embodiment of the invention.

The octamerous Fresnel zone plate 50 having rectilinear gratings used in the third embodiment is shown in FIGS. 12A and 12B. The octamerous Fresnel zone plate 50 having the rectilinear gratings is divided into eight sectors 50a, 50b, 50c, 50d, 50e, 50f, 50g and 50h by four partition lines 51l, 52l, 53l and 54l passing through the center 50o. The octamerous Fresnel zone plate in the present embodiment is formed by tangential lines of-concentric circles each having a radius proportionate to the square root of an integer. To be concrete, gratings in the sectors 50a and 50e are formed by tangential lines passing through intersecting points of a straight line dividing an acute angle formed by the partition lines 51l and 52l into two equal angles and the above described concentric circles. Gratings in the sectors 50b and 50f are formed by tangential lines passing through intersecting points of a straight line dividing an acute angle formed by the partition lines 52l and 53l into two equal angles and the above described concentric circles. Gratings in the sectors 50c and 50g are formed by tangential lines passing through intersecting points of a straight line dividing an acute angle formed by the partition lines 53l and 54l into two equal angles and the above described concentric circles. Gratings in the sectors 50d and 50h are formed by tangential lines passing through intersecting points of a straight line dividing an acute angle formed by the partition lines 54l and 51l into two equal angles and the above described concentric circles. Further, respective rectilinear gratings are formed so that alternate diagonal sectors 50a and 50c, and 50e and 50g may become equal in focal length of primary diffracted light and alternate diagonal sectors 50b and 50d, and 50f and 50h may become equal in focal length of primary diffracted light. The focusing function of each Fresnel zone plate occurs only in a direction perpendicular to the grating. In other directions such as the direction parallel to the pattern, each Fresnel zone plate have no focusing function. For brevity of description, the sectors 50a, 50c, 50e and 50g, which are equal in length, are hereafter referred to as sector A, and the sectors 50b, 50d, 50f and 50h, which are equal in length, are hereafter referred to as sector B.

Assuming that the focal length of the primary diffracted light of the sector A is fa and the focal length of the primary diffracted light of the sector is fb, astigmatic difference Δ is represented by the following equation:

$$\Delta = fa - fb.$$

At this time, distances $ra_k$ and $rb_k$ between the center 50o and the k-th boundary lines counted from the center 40o respectively of the sectors A and B are given as $$ra_k{}^2 = k \cdot fa \cdot \lambda,$$
$$rb_k{}^2 = k \cdot fb \cdot \lambda$$
$$(k = 1, 2, 3 \ldots),$$

where λ is the wavelength of reflected light of the information recording medium 5. Converting the astigmatic difference Δ into a distance Δ' in the information recording medium 5, we obtain:

$$\Delta' = \Delta/\beta^2,$$

where β is lateral magnification of a part of this optical system ranging from the information recording medium 5 to the octamerous photodetector 9, and $\beta^2$ is called longitudinal magnification. The distance corresponding to the astigmatic difference Δ' in the information recording medium 5 is typically decided to be 10 to 25 μm. From this value, therefore, the astigmatic difference Δ and the lateral magnification β are determined and the focal lengths fa and fb respectively of the sectors A and B are derived. Thus $ra_k$ and $rb_k$ are automatically determined.

In accordance with the present invention, a photodetector 9 is divided into as many photodetecting sectors 9a, 9b, 9c, 9d, 9e, 9f, 9g and 9h as sectors in the Fresnel zone plate. In this case as well, the photodetecting sectors 9a, 9c, 9e and 9g are referred to as photodetecting sector A and the photodetecting sectors 9b, 9d, 9f and 9h are referred to as photodetecting sector B for brevity in the following description.

The octamerous Fresnel zone plate 50 having rectilinear gratings obtained as described above and the octamerous photodetector 9 are disposed so that four partition lines of the octamerous Fresnel zone plate 50 and four partition lines of the octamerous photodetector 9 may overlap each other when viewed from the direction of the optical axis.

Detected signals A, B, C, D, E, F, G and H fed from the octamerous photodetector 9 are subjected to processing in adders 11a, 11b, 12a, 12b, 13a and 13b and a subtracter 15 to output a focus displacement signal F. In addition, the detected signals A, B, C, D, E, F, G and H are subjected to processing in the adders 11a, 11b, 12a, and 12b as well as adders 14a and 14b and a subtracter 16 to output a track displacement signal T. The focus displacement signal F and the track displacement signal T are represented by the following equations:

$$F=(A+C+G+E)-(B+D+F+H),$$

$$T=(A+B+G+H)-(C+D+E+F).$$

Figure 13A:
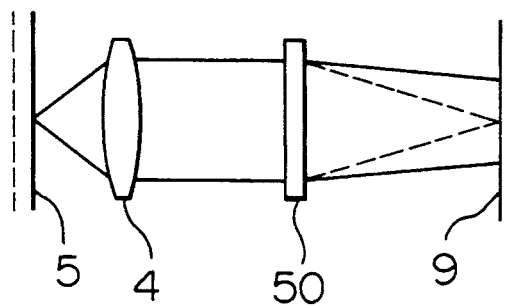
FIG. 13A is a diagram illustrating a state of bundle of rays of the case where an information recording medium is located closer as compared with the focal point of an object lens of the displacement detecting device for optical head.
Figure 13B:
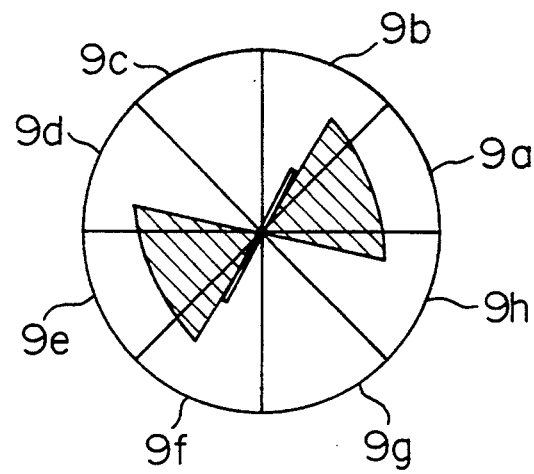
FIG. 13B is a diagram showing an image of rays for detecting displacement in the state of FIG. 13A.
Figure 14A:
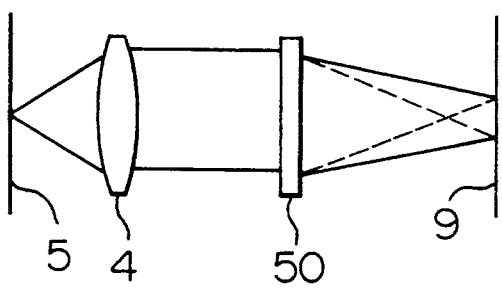
FIG. 14A is a diagram illustrating a state of bundle of rays of the case where the information recording medium is located on the focal point position of the object lens of the displacement detecting device for optical head.
Figure 14B:
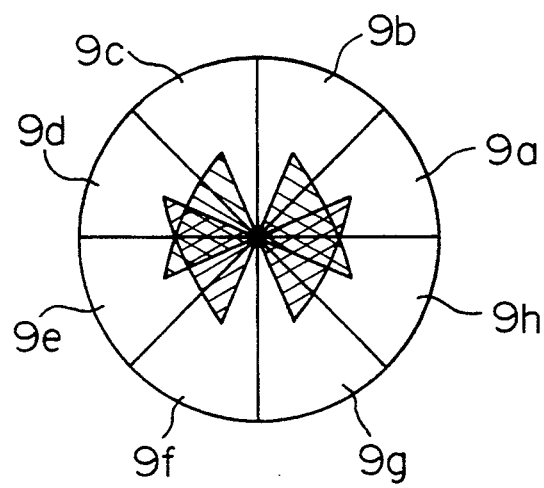
FIG. 14B is a diagram showing an image of rays for detecting displacement in the state of FIG. 14A.
Figure 15A:
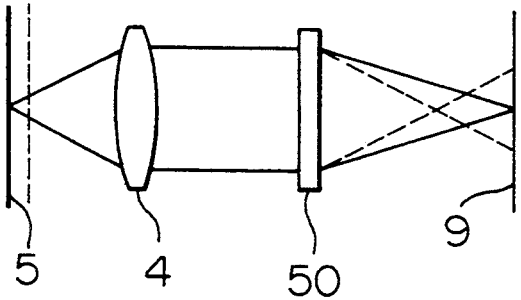
FIG. 15A is a diagram illustrating a state of bundle of rays of the case where the information recording medium is located farther as compared with the focal point of the object lens of the displacement detecting device for optical head.
Figure 15B:
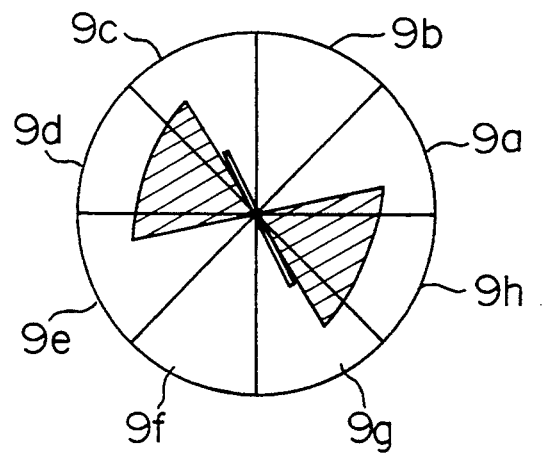
FIG. 15B is a diagram showing an image of rays for detecting displacement in the state of FIG. 15A.

Depending on the position of the object lens 4 with respect to the information recording medium 5 as illustrated in FIGS. 13A, 14A and 15A, images as shown in FIGS. 13B, 14B, and 15B are formed on the octamerous photodetector 9. The number of sectors in the Fresnel zone plate of the present embodiment is eight and the image becomes complicated. For brevity, therefore, only images of a bundle of rays transmitted through the sectors 50a and 50e representative of the sector A and a bundle of rays transmitted through the sectors 50d and 50h representative of the sector B are shown in FIGS. 13B, 14B and 15B. As described before, however, images of bundles of rays transmitted through sectors having the same focal length are identical. Therefore, the function of the present embodiment can be understood from the shapes of images of bundles of rays shown in FIGS. 13B, 14B and 15B.

The case where the information recording medium 5 is disposed closer to the object lens 4 than the focal point of the object lens 4 is shown in FIGS. 13A and 13B. Displacement detecting rays transmitted through the sector B become linear as illustrated near the focal point and are detected by the photodetecting sector B on the octamerous photodetector 9. Further, a part of the bundle of rays transmitted through the sector A is also detected by the photodetecting sector B. Therefore, the signal becomes large in the photodetecting sector B and becomes small in the photodetecting sector A. Therefore, the focus displacement signal F becomes negative.

If the information recording medium 5 is accurately located on the focal point of the object lens (FIG. 14A), the rays for detecting displacement form an image on the octamerous photodetector as shown in FIG. 14B so that respective photodetecting sectors of the octamerous photodetector may become equal in quantity of light. Therefore, the focus displacement signal F becomes 0.

Figure 16:
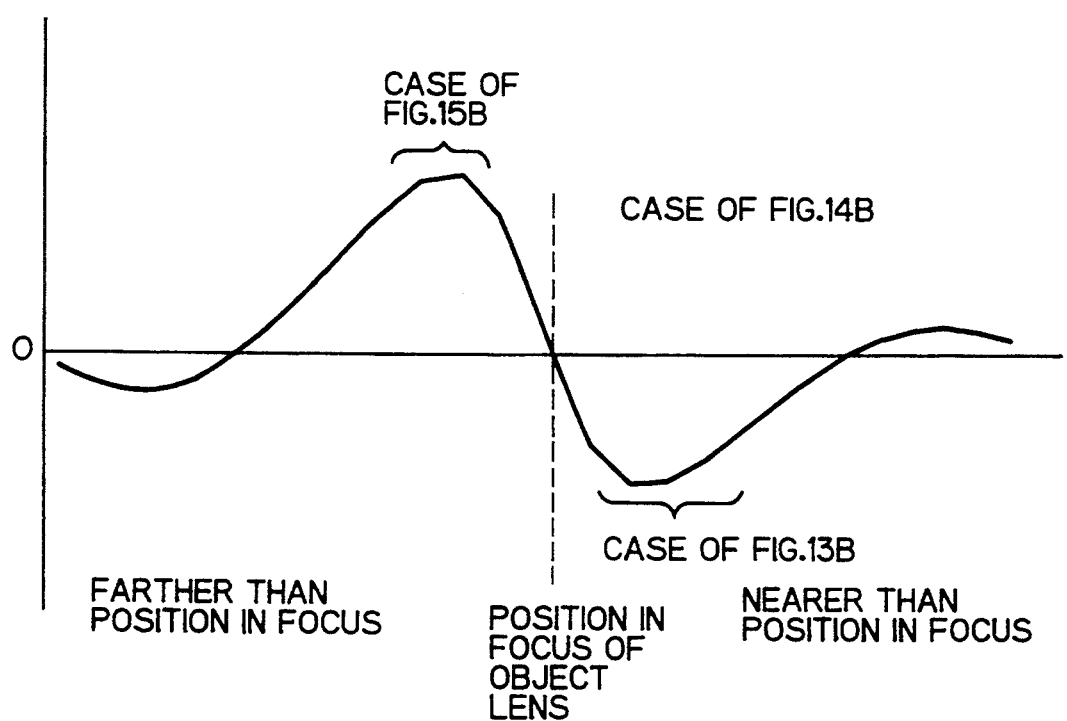
FIG. 16 is a diagram showing a focus displacement detection signal of the displacement detecting device for optical head.

The case where the information recording medium 5 is located farther than the focal point of the object lens 4 is shown in FIGS. 15A and 15B. Displacement detecting rays transmitted through the sector A form a line shape near the focal point as illustrated and are detected by the photodetecting sector A on the octamerous photodetector 9. Further, a part of the bundle of rays transmitted through the sector B is also detected by the photodetecting sector A. Therefore, the signal becomes large in the photodetecting sector A and becomes small in the photodetecting sector B. Therefore, the focus displacement signal F becomes positive. An example of the focus displacement signal F obtained in the present embodiment is shown in FIG. 16.

Assuming in FIG. 11 that a track of the information recording medium 5 is disposed in the Y or meridional direction, the shape of the image on the photodetector 9 does not change, but a difference of quantity of light is incurred in the X or sagittal direction according to the track displacement. By deriving the difference between signals of the photodetecting sectors 9a, 9b, 9g and 9h and signals of the photodetecting sectors 9c, 9d, 9e and 9f, therefore, the track displacement can be detected.

In this way, the present embodiment makes it possible to detect the focus displacement and track displacement by using an octamerous Fresnel zone plate having rectilinear gratings.

In the above described first, second and third embodiments, a quadrifid Fresnel zone plate and an octamerous Fresnel zone plate have been used. However, the number of divisions is not limited to four and eight. For any number of divisions, it is possible to form each individual Fresnel zone plate by using a rectilinear grating and detect a displacement signal in the same way as the above described embodiments. As a result of experiments performed by the present inventors, it has been found that focus displacement detection characteristics are fine in case the number of divisions is $4\times(n+1)$ where n is an integer (n=0, 1, 2, 3. . . ).

Further, as for the initial phase of the center of the Fresnel zone plate, any degree will be accepted. A Fresnel zone plate of blightness type, a Fresnel zone plate of phase inversion type or the like may also be used in the same way as the conventional configuration. Merits of the rectilinear grating are not impaired.

A Fresnel zone plate 60 divided into twelve sectors according to a fourth embodiment of the present invention is shown in FIGS. 18A and 18B. The same components as those of the optical head of the first embodiment shown in FIG. 1 are denoted by like numerals and the description thereof will be omitted.

The present embodiment differs from the first embodiment in that the Fresnel zone plate 60 obtained by dividing an elliptical Fresnel zone plate by partition lines passing through the center and by linearizing gratings with straight lines is used instead of the quadrifid Fresnel zone plate 30.

FIG. 17 shows a conventional elliptical Fresnel zone plate. FIG. 18A shows a Fresnel zone plate 60 divided in twelve sectors having rectilinear gratings and forming an elliptical outline. The Fresnel zone plate 60 formed in an elliptical shape having rectilinear gratings is divided into twelve sectors 60a, 60b, 60c, 60d, 60e, 60f, 60g, 60h, 60i, 60j, 60k and 60l by six partition lines 61l, 62l, 63l, 64l, 65l, and 66l passing through the center 60o.

Each angle between two adjacent partition lines is 30 degrees. Further, disposition is performed so that a line bisecting the angle between the sectors 60a and 60g, which is included in straight lines bisecting angles between the partition lines 61l and 66l, may coincide with the X direction and a line bisecting the sectors 60d and 60j may coincide with the Y direction. When viewed from the direction of the optical axis, the partition lines 65*l* and 62*l* and partition lines of the photodetector 9 overlap. Also in this type of Fresnel zone plate, opposite diagonal sectors are equal in focal length of primary diffracted light.

Assuming that the focal length of the sectors 60*a* and 60*g* is fa and the focal length of the sectors 60*d* and 60*j* is fd, focal lengths of other sectors can be presented as described below.

Assuming that the angle formed by a line bisecting an angle between two partition lines having each sector sandwiched between them (such as an illustrated bisecting line 70*b* in the sectors 60*b* and 60*h*) and the X (+) direction is $\theta$, the focal length f of those sectors is represented by the following expressions:

$$f = fa \cdot fd/(fd^2 \cos^2\theta + fa^2 \sin^2\theta)^{\frac{1}{2}},$$

$$fd < f < fa.$$

Therefore, the above described elliptical Fresnel zone plate has four kinds of focal lengths, such as fa, fb, fc and fd. The focal lengths are related by the following expressions:

$$fa = fg,$$
$$fb = ff = fh = fl,$$
$$fc = fe = fi = fk,$$
$$fd = fj,$$
$$fd < fc < fb < fa.$$

In the first, second and third embodiments of the present invention, each individual condensing sector is linearized in the tangential line direction of a basic concentric circle pattern. In the fourth embodiment based upon an elliptical pattern, however, linearization is not performed in the tangential line direction of the basic pattern, but the pattern in each condensing sector is linearized at the intersection of a bisecting line 70*b* of an acute angle, which is formed by two adjacent partition lines surrounding each condensing sector, and the elliptical pattern in a direction crossing the bisecting line 70*b* at right angles as exemplified in FIG. 18A.

The distance of a k-th rectilinear grating in each sector from the center 60*o* is represented by the following equation by using the above described f:

$$r_k = (k \cdot \lambda \cdot f)^{\frac{1}{2}}$$

$$(k = 1, 2, 3 \ldots).$$

In the pattern as described above as well, it is possible to obtain the focus displacement signal F and the track displacement signal T by using a photodetector 9 divided in twelve sectors in the same way as the conventional technique. Further, in a Fresnel zone plate having rectilinear gratings based upon an ellipse as well, the number of divisions is not limited to specific numbers of divisions.

As long as partition lines of the Fresnel zone plate and partition lines of the photodetector overlap in the direction of the optical axis, it is not always necessary that the sector A corresponds to the photodetecting sector A and this sector B corresponds to the photodetecting sector B. If those correspondence is inverted, the polarity of the focus displacement signal is inverted.

As evident from the description heretofore given, a displacement detecting device for optical head according to the present invention is so configured that reflected rays from the irradiated face may be converted into an astigmatic bundle of rays by optical means obtained by integrally assembling four or more Fresnel zone plates each having a rectilinear grating for focusing reflected rays from the irradiated face and having a plurality of different focal lengths, and a change in focusing shape may be detected by a photodetector to detect focusing displacement of the irradiating light. Therefore, the displacement detecting device for optical head can be fabricated easily and at a moderate cost.

We claim:

1. A displacement detecting device for an optical head emitting an irradiation light converging on a convergence position onto an irradiated face of an optical recording medium which reflects said irradiation light to provide reflected rays, said device including:

optical means for focusing said reflected rays from said irradiated face at more than one different focal point position; and detecting means for detecting displacement of said irradiation light with respect to said irradiated face on the basis of the respective focal point positions of the reflected rays;

said optical means being integrally formed by a plurality of converging members for focusing said reflected rays on a different focal point, each of said converging members having a Fresnel zone plate member having a single focal point formed by a rectilinear grating; and said detecting means having;

a photodetector for detecting a focusing shape of said reflected rays focused by said converging member and generating a detection signal; and means for detecting displacement between said convergence position of said irradiation light and said irradiated face on the basis of said detection signal.

2. A displacement detecting device for optical head according to claim 1, wherein each of said converging members comprises rectilinear gratings linearized in a direction perpendicular to a bisecting line of an acute angle formed by two adjacent partition lines defining said converging member, and said bisecting line passing through a center of said optical means.

3. A displacement detecting device for an optical head emitting an irradiation light converging on a convergence position onto an irradiated face of an optical recording medium which reflects said irradiation light to provide reflected rays, said device including:

optical means for converting said reflected rays from said irradiated face into an astigmatic bundle of rays focused on first and second focal point positions; and detecting means for detecting displacement of said radiation light with respect to said irradiated face on the basis of said first and second focal point positions of the reflected rays;

said optical means comprising:

a first group of Fresnel zone plates, each of said plates having a rectilinear grating for converging said reflected rays on said first focal point position; and a second group of Fresnel zone plates, each of said plates having a rectilinear grating for converging said reflected rays on said second focal point;

said optical means being integrally formed by said first group of Fresnel zone plates and said second group of Fresnel zone plates; and said detecting means comprising:

a photodetector for detecting a focusing shape of said reflected rays focused thereon by said first group of Fresnel zone plates and said second group of Fresnel zone plates and generating a detection signal; and means for detecting displacement between said convergence position of said irradiation light and said irradiated face on the basis of said detection signal.

4. A displacement detecting device for an optical head according to claim 3, wherein said detecting means is partitioned by partition lines passing through a center thereof so as to obtain as many of said photodetectors as the total number of Fresnel zone plates included in said first and said second groups of Fresnel zone plates.

5. A displacement detecting device for an optical head emitting an irradiation light converging on a convergence position onto an irradiated face of an information recording medium which reflects said irradiation light to provide reflected rays, and for detecting displacement between said convergence position and said irradiated face, said displacement detecting device comprising:

optical means for converging said reflected rays, said optical means including an even number of converging sector pairs, each of said converging sector pairs comprising a pair of converging sectors, said pair of converging sectors being disposed in contrapositive positions with respect to a center point of said optical means and having symmetric shapes, each of said converging sectors comprising Fresnel zone plates being to focus rays incident thereto at nearly the same focal points, each of said converging sector pairs having a focal point different from that of a condensing sector pair adjacent thereto, said Fresnel zone plate having a plurality of rectilinear gratings;

detecting means having the same number of photodetecting sectors as the number of said converging sectors, said photodetecting sectors being disposed in positions respectively corresponding to said converging sectors, said detecting means receiving said rays focused by said optical means and outputting a detected output according to quantity of said rays; and computing means for receiving said detected output and generating signals representing a focus displacement and a track displacement of said convergence position of said irradiation light from the irradiated face.

6. A displacement detecting device for an optical head according to claim 5, wherein said converging sector pairs are divided into a first group of converging sector pairs and a second group of converging sector pairs, said first group of converging sector pairs including every other converging sector pairs taken out of said converging sector pairs, said converging sectors included in said first group having a first focal length longer than a desired distance between said converging position of irradiation light and said irradiated face; and said second group of converging sector pairs including every other converging sector pairs so taken out of said converging sector pairs as to be adjacent to said first group of converging sector pairs, said converging sectors included in said second group having a second focal length shorter than said desired distance.

7. A displacement detecting device for an optical head according to claim 6, wherein said computing means generates a signal representing focus displacement based on difference between sum of said detected outputs from said detecting sectors disposed in positions corresponding to said converging sectors included in said first group and sum of said detected outputs from said detecting sectors disposed in positions corresponding to said converging sectors included in said second group, and said computing means generates a signal representing track displacement based on difference obtained between sum of detected outputs from said detecting sectors disposed on one side with respect to a straight line passing through center of said detecting means and sum of detected outputs from said detecting sectors disposed on the other side.

* * * * *